(12) United States Patent
Oppenheimer et al.

(10) Patent No.: US 8,896,452 B2
(45) Date of Patent: Nov. 25, 2014

(54) BETTLE SENSING DEVICE AND METHOD OF USE

(75) Inventors: Charles Hugh Oppenheimer, Lake Oswego, OR (US); Robert Lawrence Heberling, Camas, WA (US); Travis Johnathan Smith, Vernonia, OR (US); Luke Robert Heberling, Beaverton, OR (US)

(73) Assignee: Plurasense, Inc., Lake Oswego, OR (US)

( * ) Notice: Subject to any disclaimer, the term of this patent is extended or adjusted under 35 U.S.C. 154(b) by 460 days.

(21) Appl. No.: 13/429,333

(22) Filed: Mar. 24, 2012

(65) Prior Publication Data

US 2013/0250116 A1  Sep. 26, 2013

(51) Int. Cl.
*G08B 23/00* (2006.01)

(52) U.S. Cl.
USPC ............... 340/573.2; 340/573.1; 340/540; 348/152

(58) Field of Classification Search
CPC ......... A01M 1/106; A01M 1/26; A01M 1/10; A01M 2200/012
See application file for complete search history.

(56) References Cited

U.S. PATENT DOCUMENTS

| | | | | |
|---|---|---|---|---|
| 1,941,659 | A | * | 1/1934 | Coleman .................... 43/122 |
| 2,020,283 | A | * | 11/1935 | Armstrong et al. ............. 43/107 |
| 3,108,391 | A | * | 10/1963 | Sipos .................... 43/113 |
| 4,316,344 | A | * | 2/1982 | Carlsen .................... 43/114 |
| 4,471,563 | A | * | 9/1984 | Lindgren ................... 43/122 |
| 5,646,404 | A | * | 7/1997 | Litzkow et al. ............. 250/338.1 |
| 6,766,251 | B2 | | 7/2004 | Mafra-Neto et al. |
| 6,882,279 | B2 | | 4/2005 | Shuman et al. |
| 7,020,996 | B2 | | 4/2006 | Beroza et al. |
| 7,218,234 | B2 | | 5/2007 | Tirkel |
| 7,496,228 | B2 | | 2/2009 | Landwehr et al. |
| 2013/0162443 | A1 | * | 6/2013 | Oppenheimer et al. . 340/870.03 |

* cited by examiner

*Primary Examiner* — Travis Hunnings
(74) *Attorney, Agent, or Firm* — Bruce E Harang

(57) ABSTRACT

An imaging pest detection device, adaptable to mounting on known pest traps, utilizing a camera module and LED light providing daily gathering of images of the catch-can interior, thereby providing a remote real-time awareness of trap contents with reduced labor and increased accuracy and immediacy of trap condition.

16 Claims, 6 Drawing Sheets

BETTLE SENSING DEVICE AND METHOD OF USE

BACKGROUND OF THE INVENTION

1. Field of the Invention

The present invention generally relates to a pest monitoring device and method of imaging said pests arriving in traps set for the purpose of beetle monitoring. More particularly the present invention relates to a beetle sensing device providing daily gathering of images of the catch-can interior, thereby providing a remote real-time awareness of trap contents with reduced labor and increased accuracy and immediacy of trap condition as well as means of remotely recording data from both individual sensing devices and a plurality of said devices connected via a network.

2. Description of the Related Art

Pest monitoring is an established management tool to help protection crops, forests, and gardens against damage done by various pests including for example, beetles. Several beetle species which are pests of concern include the Bark beetles that attack conifers. Damage to, and death of, these conifers is done by these beetles burrowing in their bark. Particularly susceptible to attack are stressed trees. In the western U.S. and Canada conifers are presently under severe attack by the mountain pine beetle.

Ambrosia beetles feed on wood in various forms, including for example, live fruit and nut trees as well as on seasoning logs and/or lumber leaving pinholes which reduce the value of the lumber. As such they pose an economic threat to lumberyards.

The Japanese beetle is a truly vexing pest. The larvae feed on a broad variety of roots and the adults feed on the leaves of more than 250 important plants such as turf grasses, crops, ornamental plants, and vegetables. They presently infest the U.S. east of the Mississippi River. In addition, the risk of additional invasive beetle pest arrival is increasing as international commerce increases.

In response to such pest threats pest traps are used for manual monitoring of pest movement and population. Beetle traps are well known as a management tool to combat pest damage to agricultural, horticultural, forest and lumber resources. For example, U.S. Pat. No. 4,471,563 issued Sep. 18, 1984 to Lindgren teaches a trap for catching bark beetles and ambrosia beetles. Likewise, U.S. Pat. No. 2,020,283 issued May 10, 1935 to Armstrong et al teaches a trap for Japanese beetles.

More recently there have been efforts to automate the monitoring of pest traps including beetle traps as well as providing the ability to network a desired number of traps allowing for automated management of a plurality of traps connected into a single network. For example, U.S. Pat. No. 5,646,404 issued Jul. 8, 1997 to Litzkow et al, teaches a wired network monitoring system for a plurality of pest traps used in stored products. The traps in this teaching utilize light beam interruption for insects infesting stored grain products.

Similarly, U.S. Pat. No. 6,882,279 issued Apr. 19, 2005 to Shuman, et al, teaches the use of a wireless network monitoring system for a plurality of pest traps used in stored products using variously directed multiple beams to size the trapped insects.

U.S. Pat. No. 6,766,251 issued Jul. 20, 2004 to Mafra-Neto, et al, teaches a wireless network monitoring system for a plurality of pest traps to monitor arbitrary agricultural pests using arbitrary sensors.

The sensing method in these related art references utilize transmissive optical sensing having sensing passageways for falling pests between an LED emitter and a photo detector sensor which is located near the boundaries of, and horizontally and diametrically opposed across a section of the passageway. An arriving pest breaks a beam radiated by the emitter, casting a shadow upon the photo-detector sensor. Electromagnetic sensing is another detection approach taught in U.S. Pat. No. 7,218,234 issued May 15, 2007 to Tirkel wherein electromagnetic radiating and sensing elements detect pest movements of pests in a cavity.

One limitation of devices utilizing transmissive optics or electromagnetic sensing schemes is that they are "blind" and cannot identify arrivals or discriminate between arrival types, e.g. the harmful pest or the beneficial predator. U.S. Pat. No. 7,020,996 issued Apr. 4, 2006 to Beroza et al, strives to overcome this limitation by teaching acoustic signature identification of arrivals.

The present invention overcomes the limitation by daily gathering of images of a beetle trap's catch-can interior, thereby providing a remote real-time awareness of trap contents with reduced labor and increased accuracy and immediacy of trap condition. The images may be transmitted for pest arrival detection, identification and discrimination either by human viewing or by machines programmed to do so as described in U.S. Pat. No. 7,496,228 issued Feb. 24, 2009 to Landwehr et al.

Thus, there remains a need for a cost effective pest monitor with the ability to provide daily gathering of images of the catch-can interior, thereby providing a remote real-time awareness of trap contents with reduced labor and increased accuracy and immediacy of trap condition.

DISCLOSURE OF THE INVENTION

The present invention provides advantages and alternatives over the prior art by providing a pest trap sensor providing daily gathering of images of the catch-can interior, thereby providing a remote real-time awareness of trap contents with reduced labor and increased accuracy and immediacy of trap condition.

According to a further aspect of the present invention, invention there is provided a pest trap sensor which is suitable for use with well known pest traps such as U.S. Pat. No. 4,471,563 issued Sep. 18, 1984 to Lindgren, and herein incorporated by reference, for catching bark beetles and ambrosia beetles as well as that of U.S. Pat. No. 2,020,283 issued May 10, 1935 to Armstrong et al, and herein incorporated by reference, for catching Japanese beetles.

According to yet another aspect of the present invention there is provided a pest trap sensor suitable for use as a node in a wired or wireless network of a plurality of the same and/or different pest trap sensors and which is capable of providing images of the catch can interior.

Yet another particularly preferred embodiment of the present invention provides an imaging type pest detection sensor assembly suitable for connection to, and use with, known downward deflecting gravity assisted pest traps in which pests are deflected downward and fall by gravity comprising in cooperative combination: an imaging trap monitoring assembly comprising a body section having a pest passageway, a catch can connecting fixture on a first end and a beetle trap connecting coupling and retaining flange on a second end, said catch can connection fixture further having a cable assembly providing a connection means for an imaging cable and a bracket for mounting a camera module and a LED, and a bore for cooperatively removably connecting a catch can assembly thereto; a catch can assembly comprising; a cooperatively dimensioned trapping container having a first end mountable to the exit of said imaging trap monitoring assembly through a cooperative mounting means for mounting within said imaging trap monitoring assembly bore, a second end sealed thereby forming a collection container, further having moisture drain bore; and a camera module comprising a camera and a LED fixedly mounted to said bracket of said imaging trap monitor connecting to a power source and a data collection network by suitable cabling; thereby creating an imaging pest detection device adaptable to mounting on known downward deflecting gravity assisted pest traps utilizing a camera module and LED light providing daily gathering of images of the catch-can interior, thereby providing a remote real-time awareness of trap contents with reduced labor and increased accuracy and immediacy of trap condition.

Still yet another particularly preferred embodiment of the present invention provides an imaging type pest detection sensor assembly suitable for connection to, and use with, known downward deflecting gravity assisted pest traps in which pests are deflected downward and fall by gravity comprising in cooperative combination: an imaging trap monitoring assembly comprising a body section having a pest passageway, a catch can connecting fixture on a first end and a beetle trap connecting coupling and retaining flange on a second end, said catch can connection fixture further having a cable assembly providing a connection means for an imaging cable and integral mounting unit for mounting a camera module and a LED, and a bore for cooperatively removably connecting a catch can assembly thereto; a catch can assembly comprising; a cooperatively dimensioned trapping container having a first end mountable to the exit of said imaging trap monitoring assembly through a cooperative mounting means for mounting within said imaging trap monitoring assembly bore, a second end sealed thereby forming a collection container, further having moisture drain bore; and a camera module comprising a camera and a LED fixedly mounted to said integral mounting unit of said imaging trap monitor connecting to a power source and a data collection network by suitable cabling; thereby creating an imaging pest detection device adaptable to mounting on known downward deflecting gravity assisted pest traps utilizing a camera module and LED light providing daily gathering of images of the catch can interior, and thereby further providing a remote real-time awareness of trap contents with reduced labor and increased accuracy and immediacy of trap condition.

Yet another particularly preferred embodiment of the present invention provides a pest monitoring network utilizing a plurality of imaging trap monitors having, one or more of said plurality of imaging trap monitors forming a plurality of nodes electronically connected to a gateway device, said gateway device electronically connected to a cloud server accessible to a plurality of user interface devices, thereby allowing processing and management of data collected by said plurality of sensors, including but not limited to, daily gathering of images of the catch-can interior, thereby providing a remote real-time awareness of trap contents with reduced labor and increased accuracy and immediacy of trap condition.

The present invention thus advantageously provides a pest trap sensor providing daily gathering of images of the catch-can interior, thereby providing a remote real-time awareness of trap contents with reduced labor and increased accuracy and immediacy of trap condition.

DESCRIPTION OF THE PREFERRED EMBODIMENTS OF THE INVENTION

Figure 1:
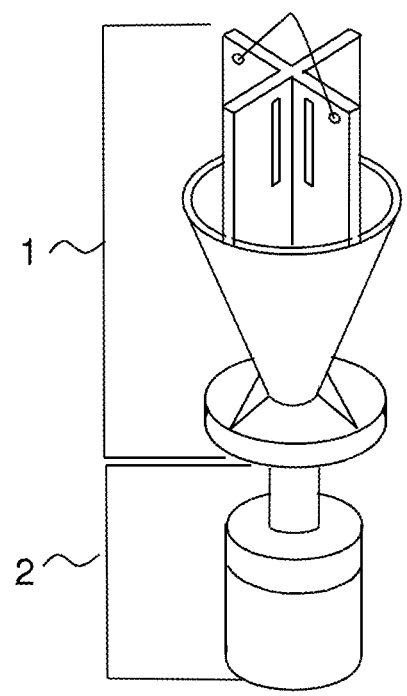
FIG. 1 shows a perspective view of an imaging trap monitor assembly of the present invention mounted on a prior art pest trap of Armstrong et al.

Reference will now be made to the drawings, wherein to the extent possible like reference numerals are utilized to designate like components throughout the various views. Referring to FIG. 1 there is shown a prior art Armstrong beetle trap 1 having an imaging trap monitor assembly 2 of the present invention mounted to the outfall of said Armstrong beetle trap. The construction and use of the Armstrong Japanese beetle trap is taught in U.S. Pat. No. 2,020,283 issued May 10, 1935 and herein incorporated by reference. The Armstrong et al beetle traps require the use of an attractant to lure flying beetles, which upon attempting to land on the trap slip and fall under gravity, eventually reaching the catch-can 4 (see FIGS. 2 and 3) containing the camera module 11 and LED 12 (see FIG. 3) of the present invention. Said imaging trap monitor assembly being fitted to the bottom of beetle trap 1 catches the trapped beetle and as said trapped beetle falls through said imaging trap monitor assembly has its image acquired, time stamped, and collected.

Figure 2:
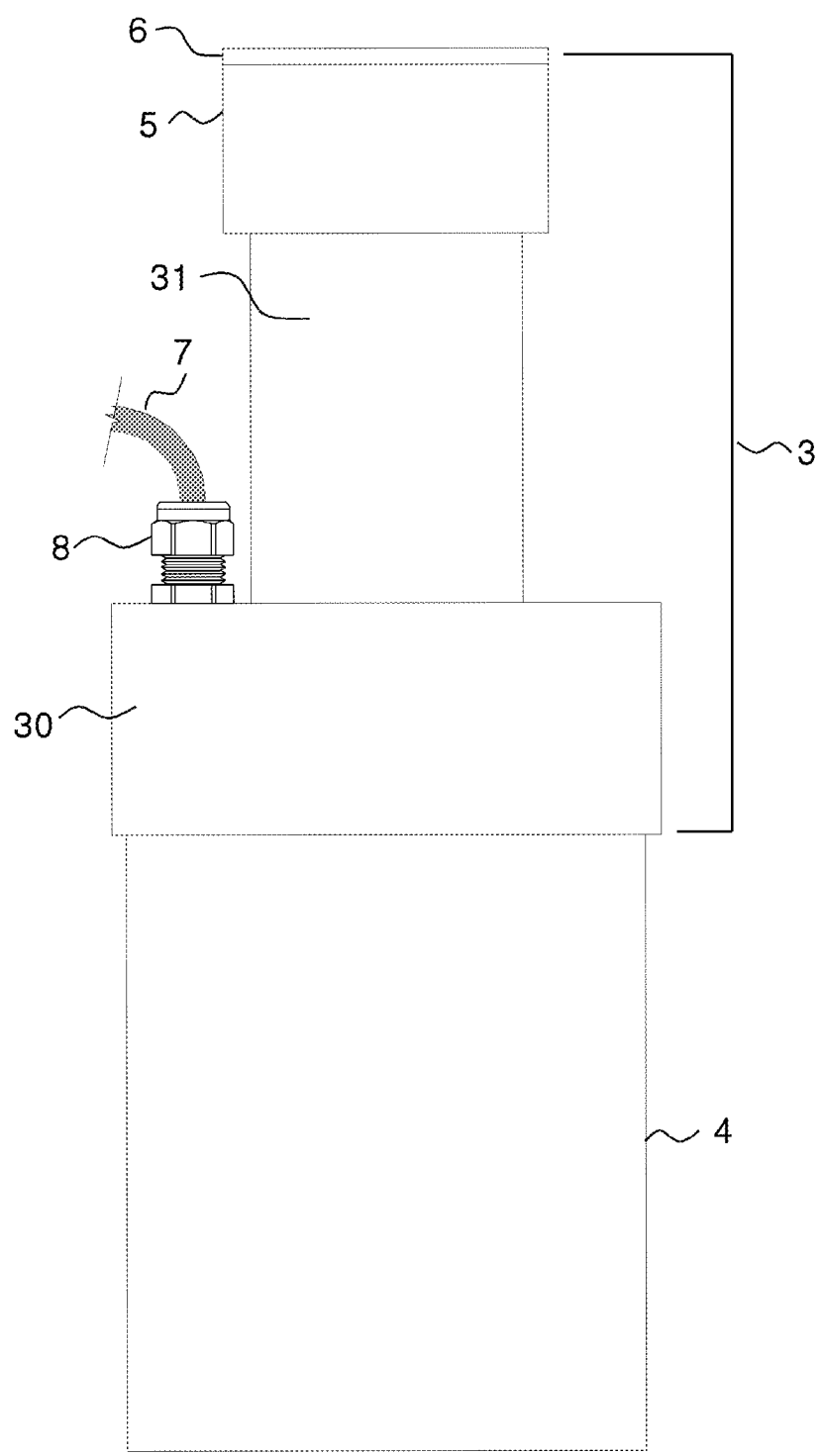
FIG. 2 shows a plan view of the imaging trap monitor assembly of the present invention.

Referring now to FIG. 2, there is shown a plan side view of an imaging trap monitor assembly 2 (see FIG. 1) comprising generally a throat assembly 3 and a catch can 4. More particularly, imaging trap monitor assembly 2 (see FIG. 1) comprises a throat assembly 3 having a body section 31 with a catch can connecting fixture 30 on a first end and a beetle trap connecting threaded coupling 5 retained by a flange 6 on a second end. Said threaded coupling 5 having male threads dimensioned to screw into the cooperating female threads on the outfall end of a pest trap (see FIG. 1, no. 1) Said catch can connection fixture 30 further having a cable gland assembly 8 providing a connection means for imaging cable 7. Also shown is catch can 4 attached to said first end 30 of throat assembly 3 ready for use.

Figure 3:
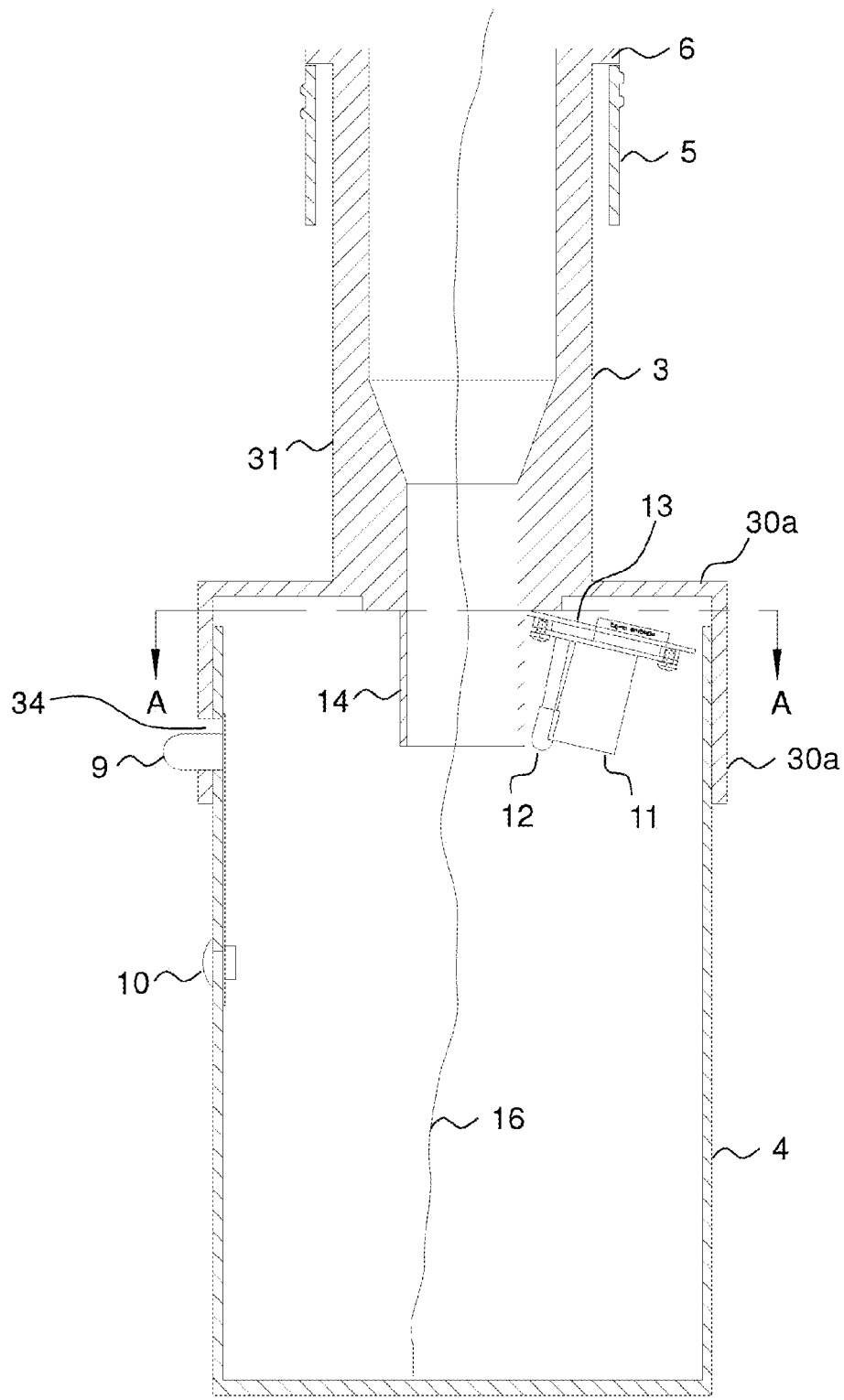
FIG. 3 shows a sectional view along line B-B of one preferred embodiment of the imaging trap monitor assembly of the present invention.

Referring further to FIG. 3, there is shown a plan cross sectional view of imaging trap monitor assembly 2 (see FIG. 1) through line B-B (see FIG. 4) comprising generally a throat assembly 3 and a catch can 4. More particularly, imaging trap monitor assembly 2 (see FIG. 1) comprises a throat assembly 3 having a body section 31 and integral passageway 14 with a catch can connecting fixture 30a on said first end and a beetle trap male threaded connecting coupling 5 retained by a flange 6 on said second end. Mounted within said catch can connection fixture 30a is a bracket 13 suitable for mounting a camera module 11 and LED 12 therein. Catch can 4 comprising an open can 4 having a snap button 9 for connection to can connection fixture 30a through cooperating connection bore 34 and mounting means 10 in the sidewall of said catch can 4 permanently fixing snap button 9 thereto. Also shown is a typical beetle path 16 through throat assembly 3 and into catch can 4.

Figure 4:
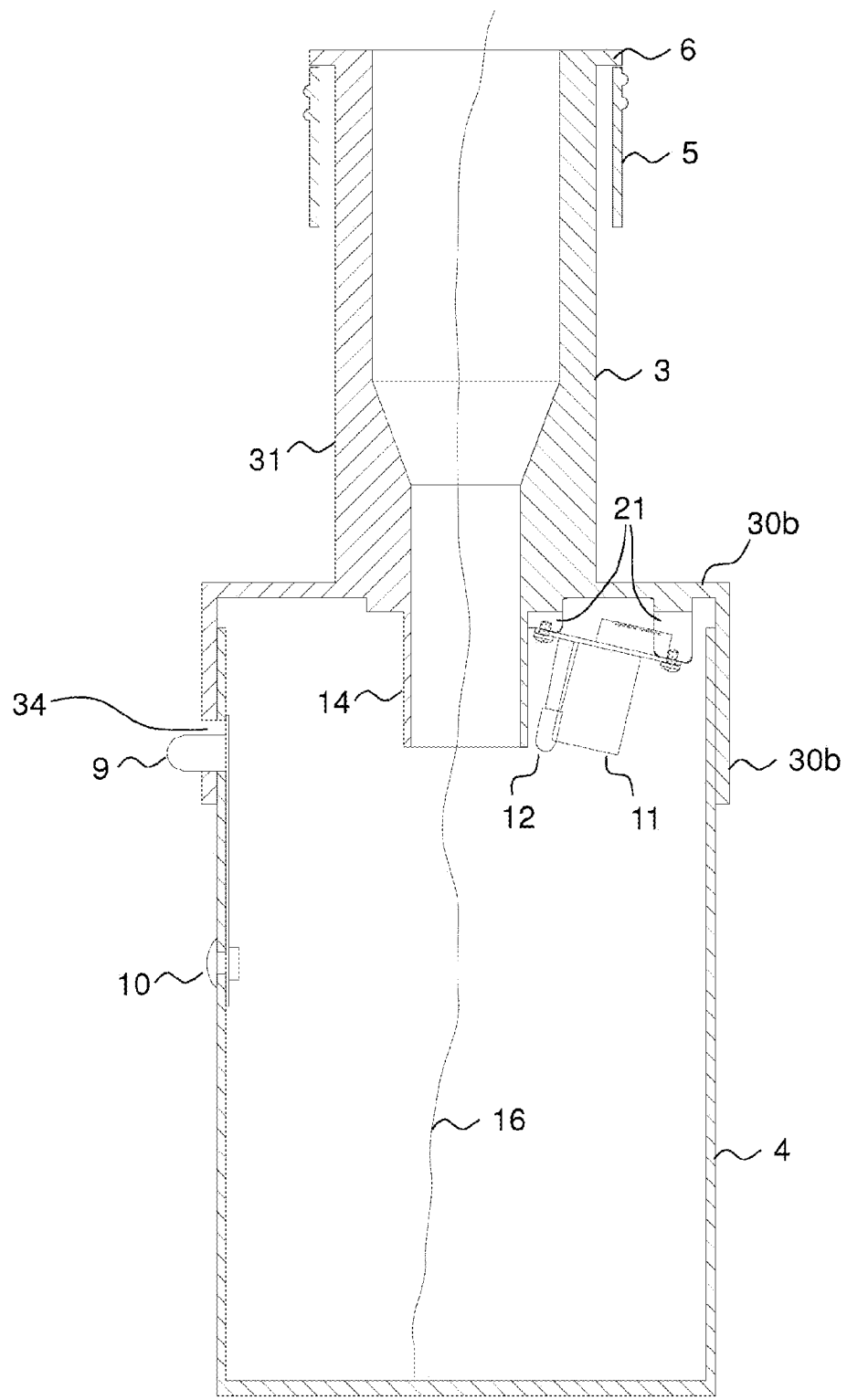
FIG. 4 shows a sectional view along line B-B of another preferred embodiment of the imaging trap monitor assembly of the present invention.

Referring now to FIG. 4, there is shown a plan cross sectional view of imaging trap monitor assembly 2 (see FIG. 1) through line B-B (see FIG. 4) comprising generally a throat assembly 3 and a catch can 4. More particularly, imaging trap monitor assembly 2 (see FIG. 1) comprises a throat assembly 3 having a body section 31 and integral passageway 14 with an integrally formed catch can connecting fixture 30b on said first end and a beetle trap male threaded connecting coupling 5 retained by a flange 6 on said second end. Mounted within said integrally formed catch can connecting fixture 30b by means of integrally formed mounting portions 21 is a camera module 11 and LED 12. Catch can 4 comprising an open can 4 having a snap button 9 for connection to can connection fixture 30 through cooperating connection bore 34 and mounting means 10 in the sidewall of said catch can 4 permanently fixing snap button 9 thereto. Also shown is a typical beetle path 16 through throat assembly 3 and into catch can 4.

Figure 5:
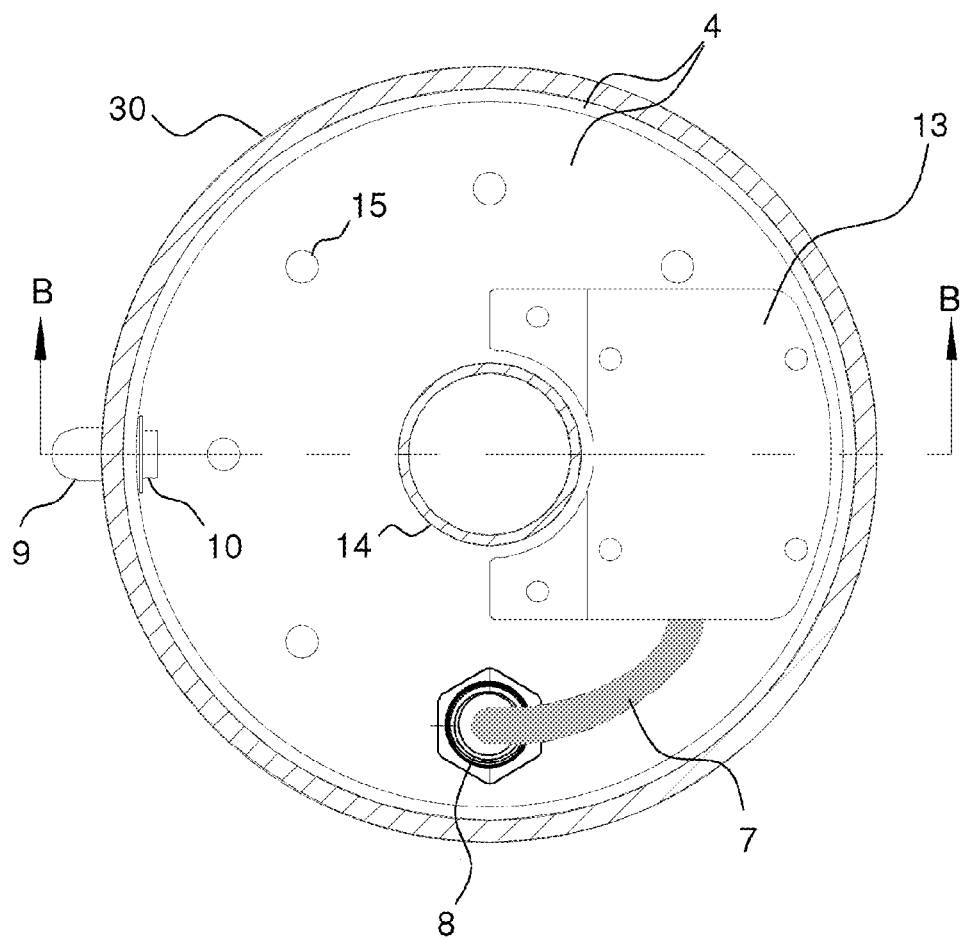
FIG. 5 shows a sectional view along line A-A of imaging trap monitor assembly of the present invention.

Referring to FIG. 5 there is shown a plan cross sectional view of imaging trap monitor assembly 2 (see FIG. 1) through line A-A (see FIG. 3) comprising generally catch can 4 mounted to can connection fixture 30 of throat assembly 3. More particularly, catch can 4 comprising said catch can having a mounting means 10 permanently fixing said snap button 9 to said sidewall of catch can 4, a snap button 9 mounted in the sidewall thereof and connecting said catch can 4 to throat assembly 3 by means of can connection fixture 30 having a bore 34 (see FIG. 3) therein capable of cooperatingly connecting catch can 4 to throat assembly 3 by means of snap button 9. Also shown is passageway 14 of throat assembly 3, catch can 4 drainage bore 15 and camera module/LED mounting bracket 13. Finally shown are camera module 11 and LED 12 and imaging cable 7 mounted to said can connection fixture 30 by means of cable gland assembly 8.

Figure 6:
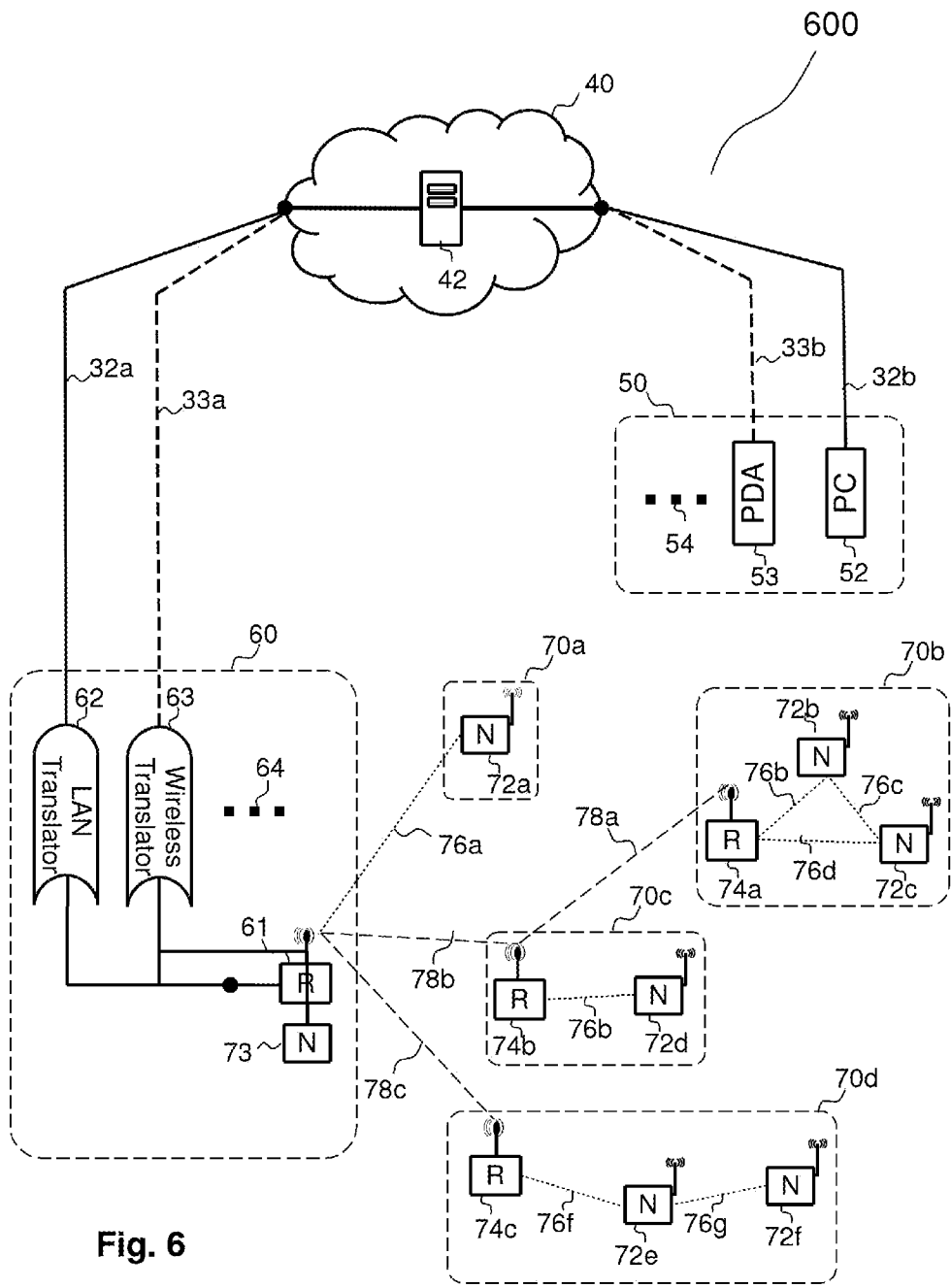
FIG. 6 shows a schematic view of a network comprising a plurality of imaging trap monitor assemblies of the present invention.

Finally, turning to FIG. 6 there is shown pest monitoring network 600 utilizing a plurality of presently claimed imaging trap monitors 2. One or more of said sensors 2 forming clusters 70a-70d. Cluster 70a, for example, illustrating a node 72a comprising a single pest trap 1 and imaging trap monitors 2, at short range, wirelessly connected to a gateway device 60 by means of wireless connection 76a to gateway interface 61. Similarly cluster 70c illustrates note 72d comprising a single pest trap 1 and imaging trap monitors 2, at longer range wirelessly 76b connected to a router 74b, said router 74b wirelessly connected to gateway device 60 by means of wireless connection 78b. Likewise, cluster 70b illustrates multiple nodes 72b and 72c, each comprising pest trap 1 and imaging trap monitors 2, connected wirelessly in parallel by wireless connections 76b-76d to a router 74a. Router 74a is wirelessly connected to router 74b by means of wireless connection 78a and then to gateway interface 61 over wireless connection 78b. Further there is illustrated multiple nodes 72e and 72f, each comprising pest trap 1 and imaging trap monitors 2, connected wirelessly in series by wireless connections 76f-76g to a gateway interface 61 over wireless connection 78c. Finally, node 73 having a trap 1 and imaging trap monitors 2 connected by wire directly to said gateway interface 61.

Gateway 61 is electrically connected to a wired LAN 62, wireless WLAN 63 or other suitable translator and protocol 64 by means of wired connection 32a or wireless connection 33a to server 42 within a cloud 40. Said server 42 within said cloud 40 accessible, by a user, by means of client cluster 50 comprising one or more of PC 52, PDA 53, or other device 54, such as for example, a smart phone or pad computer.

In its broadest form the claimed invention comprises an improved imaging type pest detection sensor assembly suitable for use with known pest traps in which pests are deflected downward and fall by gravity comprising in cooperative combination:

In practice the transmission of pest data to said server 42 within said cloud 40 happens on a desired periodic basis, for example every 24 hours or whenever interrogated by a device within said client cluster 50. The server 42 processes the pest data, included but not limited to, arrival time of each pest. The server 42 then notifies the devices 52-54 in the client cluster 50 when the computer 42 has detected such pest data. Further, devices 52-54 within the client cluster 50 may query for any received data. It is to be further understood that the camera module and LED may be continually on, or they may be turned on and off as needed to capture desired images at desired times.

Suitable camera modules, LEDs, cables, cable gland assemblies, and housing construction materials are well known in the art. A presently preferred camera module for use in the present invention is an Adafruit-VC0706. Presently preferred LEDs are supplied by AND Optoelectronics model 520HW. Presently preferred materials for construction of the catch can assembly, and the imaging trap monitor assembly is PVC. The presently preferred snap button mounting means is a rivet. It is to be understood that other materials such as, for example, metal, molded plastics, engineered materials, and the like may be used for the housing. It is to be further understood that the catch can geometry is not critical beyond being cooperating connectable to said throat assembly. And further that said cooperating connecting means may be any well known in the art including for example, threads, clamps, fasteners, bayonet mounts, and the like.

Suitable means of co-operative connection include, for example, snap button connections, threaded connections, bayonet connections, and pressure fit connections. Presently preferred are snap button connections comprising compatible bore and snap button.

Thus, the present invention provides imaging of individual beetles for taxonomic identification from remote collection sites.

One particularly preferred embodiment of the present invention provides an imaging type pest detection sensor assembly suitable for connection to, and use with, known downward deflecting gravity assisted pest traps in which pests are deflected downward and fall by gravity comprising in cooperative combination: an imaging trap monitoring assembly comprising a body section having a pest passageway, a catch can connecting fixture on a first end and a beetle trap connecting coupling and retaining flange on a second end, said catch can connection fixture further having a cable assembly providing a connection means for an imaging cable and a bracket for mounting a camera module and a LED, and a bore for cooperatively removably connecting a catch can assembly thereto; a catch can assembly comprising; a cooperatively dimensioned trapping container having a first end mountable to the exit of said imaging trap monitoring assembly through a cooperative mounting means for mounting within said imaging trap monitoring assembly bore, a second end sealed thereby forming a collection container, further having moisture drain bore; and a camera module comprising a camera and a LED fixedly mounted to said bracket of said imaging trap monitor connecting to a power source and a data collection network by suitable cabling; thereby creating an imaging pest detection device adaptable to mounting on known downward deflecting gravity assisted pest traps utilizing a camera module and LED light providing daily gathering of images of the catch-can interior, thereby providing a remote real-time awareness of trap contents with reduced labor and increased accuracy and immediacy of trap condition.

Another particularly preferred embodiment of the present invention provides an imaging type pest detection sensor assembly suitable for connection to, and use with, known downward deflecting gravity assisted pest traps in which pests are deflected downward and fall by gravity comprising in cooperative combination: an imaging trap monitoring assembly comprising a body section having a pest passageway, a catch can connecting fixture on a first end and a beetle trap connecting coupling and retaining flange on a second end, said catch can connection fixture further having a cable assembly providing a connection means for an imaging cable and integral mounting unit for mounting a camera module and a LED, and a bore for cooperatively removably connecting a catch can assembly thereto; a catch can assembly comprising; a cooperatively dimensioned trapping container having a first end mountable to the exit of said imaging trap monitoring assembly through a cooperative mounting means for mounting within said imaging trap monitoring assembly bore, a second end sealed thereby forming a collection container, further having moisture drain bore; and a camera module comprising a camera and a LED fixedly mounted to said integral mounting unit of said imaging trap monitor connecting to a power source and a data collection network by suitable cabling; thereby creating an imaging pest detection device adaptable to mounting on known downward deflecting gravity assisted pest traps utilizing a camera module and LED light providing daily gathering of images of the catch can interior, and thereby further providing a remote real-time awareness of trap contents with reduced labor and increased accuracy and immediacy of trap condition.

Yet another particularly preferred embodiment of the present invention provides a pest monitoring network utilizing a plurality of imaging trap monitors having, one or more of said plurality of imaging trap monitors forming a plurality of nodes electronically connected to a gateway device, said gateway device electronically connected to a cloud server accessible to a plurality of user interface devices, thereby allowing processing and management of data collected by said plurality of sensors, including but not limited to, daily gathering of images of the catch-can interior, thereby providing a remote real-time awareness of trap contents with reduced labor and increased accuracy and immediacy of trap condition.

Although the preferred embodiments of the present invention has been disclosed, various changes and modifications may be made without departing from the scope of the invention as set forth in the appended claims.

What is claimed is:

1. An imaging type pest detection sensor assembly suitable for connection to, and use with, known downward deflecting gravity assisted pest traps in which pests are deflected downward and fall by gravity comprising in cooperative combination:
  a) an imaging trap monitoring assembly comprising a body section having a pest passageway, a catch can connecting fixture on a first end and a beetle trap connecting coupling and retaining flange on a second end, said catch can connection fixture further having a cable assembly providing a connection means for an imaging cable and a bracket for mounting a camera module and a LED, and a bore for cooperatively removably connecting a catch can assembly thereto;
  b) a catch can assembly comprising; a cooperatively dimensioned trapping container having a first end mountable to the exit of said imaging trap monitoring assembly through a cooperative mounting means for mounting within said imaging trap monitoring assembly bore, a second end sealed thereby forming a collection container, further having moisture drain bore; and
  c) a camera module comprising a camera and a LED fixedly mounted to said bracket of said imaging trap monitor connecting to a power source and a data collection network by suitable cabling;
  thereby creating an imaging pest detection device adaptable to mounting on known downward deflecting gravity assisted pest traps utilizing a camera module and LED light providing daily gathering of images of the catch-can interior, thereby providing a remote real-time awareness of trap contents with reduced labor and increased accuracy and immediacy of trap condition.

2. The imaging type pest detection sensor assembly as claimed in claim 1 wherein, said imaging trap assembly, and said catch can assembly comprises PVC pipe, conduit and fittings using snap button connection between said imaging trap assembly, and said catch can assembly.

3. The imaging trap assembly as claimed in claim 1 wherein, said catch can assembly further comprises a suitably located and dimensioned drain bore for allowing moisture said to escape and preventing trapped pests through said drain bore.

4. The imaging type pest detection sensor assembly as claimed in claim 1 wherein, said camera module comprises an Adafruit-V0706 camera module.

5. The imaging type pest detection sensor assembly as claimed in claim 1 wherein, said LED comprises an AND Optoelectronics 520HW LED.

6. An imaging type pest detection sensor assembly suitable for connection to, and use with, known downward deflecting gravity assisted pest traps in which pests are deflected downward and fall by gravity comprising in cooperative combination:
  a) an imaging trap monitoring assembly comprising a body section having a pest passageway, a catch can connecting fixture on a first end and a beetle trap connecting coupling and retaining flange on a second end, said catch can connection fixture further having a cable assembly providing a connection means for an imaging cable and integral mounting unit for mounting a camera module and a LED, and a bore for cooperatively removably connecting a catch can assembly thereto;
  b) a catch can assembly comprising; a cooperatively dimensioned trapping container having a first end mountable to the exit of said imaging trap monitoring assembly through a cooperative mounting means for mounting within said imaging trap monitoring assembly bore, a second end sealed thereby forming a collection container, further having moisture drain bore; and
  c) a camera module comprising a camera and a LED fixedly mounted to said integral mounting unit of said imaging trap monitor connecting to a power source and a data collection network by suitable cabling;
  thereby creating an imaging pest detection device adaptable to mounting on known downward deflecting gravity assisted pest traps utilizing a camera module and LED light providing daily gathering of images of the catch can interior, and thereby further providing a remote real-time awareness of trap contents with reduced labor and increased accuracy and immediacy of trap condition.

7. The imaging type pest detection sensor assembly as claimed in claim 6 wherein, said imaging trap assembly, and said catch can assembly comprises PVC pipe, conduit and fittings using snap button connection between said imaging trap assembly, and said catch can assembly.

8. The imaging trap assembly as claimed in claim 6 wherein, said catch can assembly further comprises a suitably located and dimensioned drain bore for allowing moisture said to escape and preventing trapped pests through said drain bore.

9. The imaging type pest detection sensor assembly as claimed in claim 6 wherein, said camera module comprises an Adafruit-V0706 camera module.

10. The imaging type pest detection sensor assembly as claimed in claim 6 wherein, said LED comprises an AND Optoelectronics 520HW LED.

11. A pest monitoring network utilizing a plurality of imaging trap assembly sensors as claimed in claim 1 having, at least one of said plurality of imaging trap assembly sensors forming a plurality of nodes electronically connected to a gateway device, said gateway device electronically connected to a cloud server accessible to a plurality of cloud-connected user interface devices, thereby allowing visibility, processing and management of data collected by said plurality of sensors.

12. A pest monitoring network as claimed in claim 11 wherein, said nodes are selected from the group comprising wired nodes, wireless nodes, and combinations thereof.

13. A pest monitoring network as claimed in claim 11 wherein, said user interface devices are selected from the group comprising desktop computers, laptop computers, tablets, smart phones, net books, and combinations thereof.

14. A pest monitoring network utilizing a plurality of imaging trap assembly sensors as claimed in claim 6 having, at least one of said plurality of imaging trap assembly sensors forming a plurality of nodes electronically connected to a gateway device, said gateway device electronically connected to a cloud server accessible to a plurality of cloud-connected user interface devices, thereby allowing visibility, processing and management of data collected by said plurality of sensors.

15. A pest monitoring network as claimed in claim 14 wherein, said nodes are selected from the group comprising wired nodes, wireless nodes, and combinations thereof.

16. A pest monitoring network as claimed in claim 14 wherein, said user interface devices are selected from the group comprising desktop computers, laptop computers, tablets, smart phones, net books, and combinations thereof.

* * * * *